P. GANZHORN.
FINGER GUARD FOR HOPPERS OF MEAT CHOPPERS.
APPLICATION FILED SEPT. 18, 1911.
1,066,722.
Patented July 8, 1913.
2 SHEETS—SHEET 2.
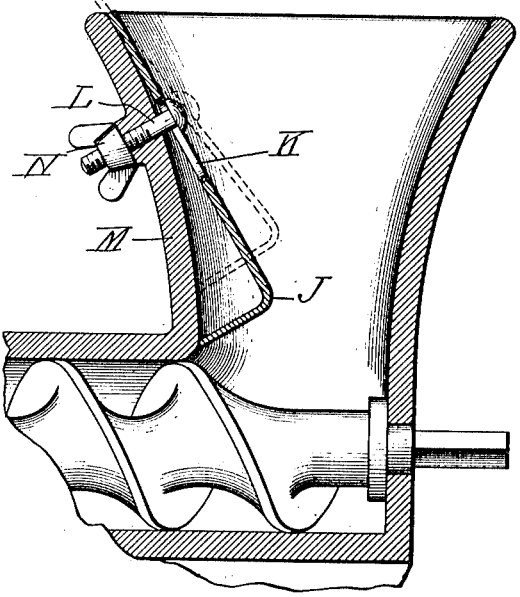
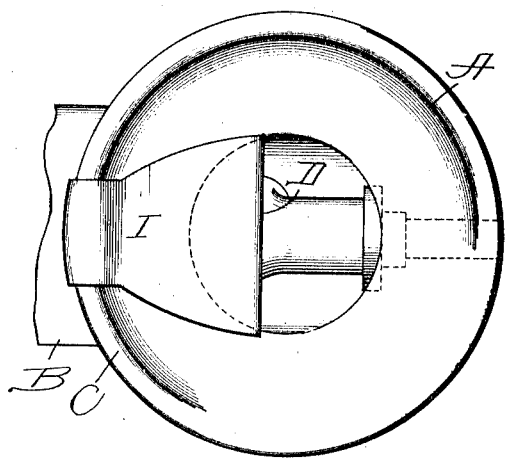

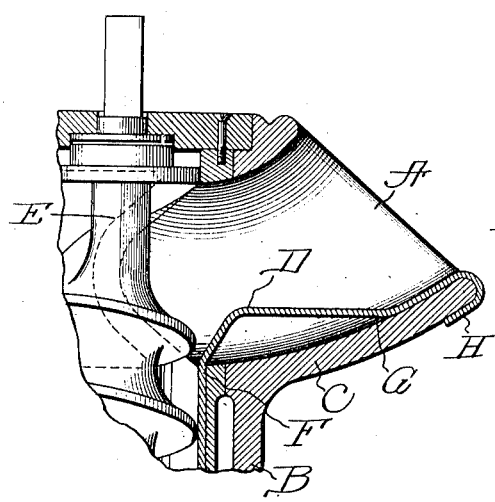
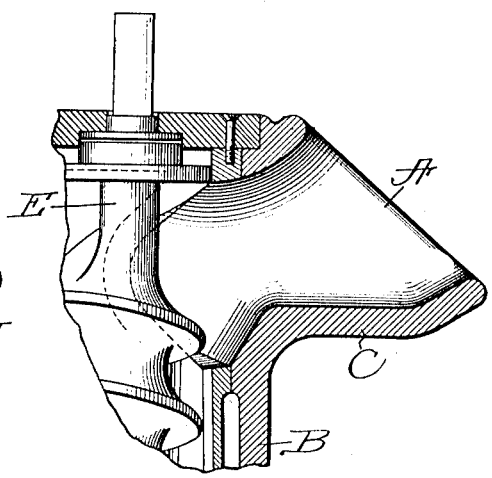
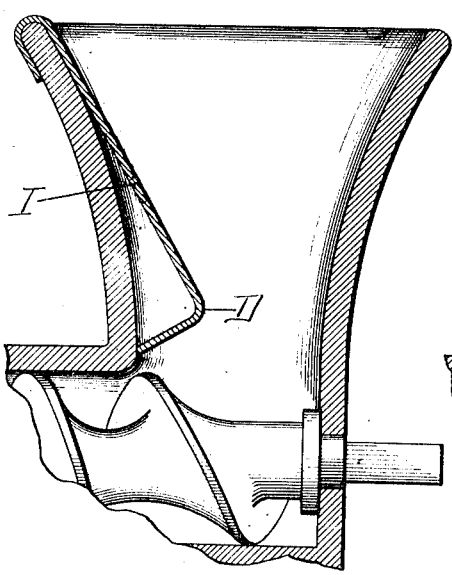
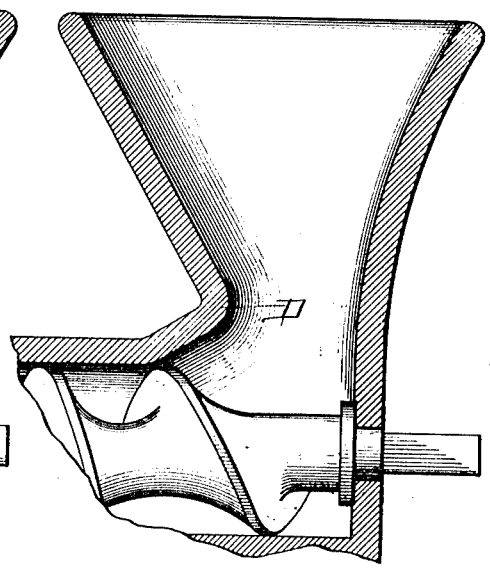

UNITED STATES PATENT OFFICE.

PHILIP GANZHORN, OF CHICAGO, ILLINOIS.

FINGER-GUARD FOR HOPPERS OF MEAT-CHOPPERS.

1,066,722. Specification of Letters Patent. Patented July 8, 1913.

Application filed September 18, 1911. Serial No. 649,868.

*To all whom it may concern:*

Be it known that I, PHILIP GANZHORN, citizen of the United States, residing at Chicago, in the county of Cook and State of Illinois, have invented certain new and useful Improvements in Finger-Guards for Hoppers of Meat-Choppers; and I do hereby declare the following to be a full, clear, and exact description of the invention, such as will enable others skilled in the art to which it appertains to make and use the same.

This invention relates to a novel construction in a hopper or feed spout for meat chopping machines and the like, and has for its object to provide a device of this character in which means are provided for preventing the fingers of the operator from being caught between the walls of the barrel and the peripheral edge of the helix for forcing the meat to be chopped through the barrel.

The invention consists in the features of construction and combinations of parts hereinafter fully described and claimed.

In the accompanying drawings illustrating the invention: Figure —1— is a fragmentary central vertical section of a vertically disposed meat chopper having a feed hopper equipped with a finger guard constructed in accordance with my invention. Fig. —2— is a similar view showing the hopper case with the finger guard integral with one wall thereof. Fig. —3— is a view similar to Fig. —1— showing the hopper of a horizontally disposed meat chopper equipped with a finger guard constructed in accordance with my invention. Fig. —4— is a view similar to Fig. —3— showing the hopper cast with the finger guard integral therewith. Fig. —5— is a fragmentary top plan view of the hopper portion of a meat chopper showing the position of the finger guard therein. Fig. —6— is a sectional view similar to Fig. —3— showing means for rendering the finger guard adjustable within the hopper.

In the operation of meat choppers in meat markets, sausage factories and the like, the operator is usually forced to press the meat to be chopped into the barrel and into engaging relation to the screw shaft or helix which conveys the same forcibly through the barrel toward the cutting means. Owing to the resistance offered at the delivery end of the barrel by the perforated plate through which the meat must be forced it is not infrequent that the smaller pieces back up toward the inlet end of the barrel so that in order to prevent such return movement the operator is obliged to exert a pressure upon the contents of the feed hopper. In so doing it not infrequently happens that the operator inserts his fingers so far into the feed hopper as to thrust them into the barrel and they are then liable to be caught between the helix or screw shaft and the corner at which the barrel connects with the hopper with the result that such fingers are mashed and frequently cut off. To obviate this difficulty and prevent such accidents is the object of the present invention and is effected by providing within the hopper A and on the wall thereof which connects with the barrel B between the ends thereof, as indicated at C in Fig. —1—, a V-shaped projection or hump D which serves to contract the discharge end portion of the hopper A and prevent the finger of the operator from being thrust into the barrel at a point where the same may be caught between the first convolution of the helix or screw shaft E and the corner F formed by the juncture of the wall C of the hopper with the barrel B. The said hump D may be formed by casting the hopper in the form shown in Fig. —2— or it may be provided in existing hoppers by inserting therein a sheet metal plate G, shown in Fig. —1—, shaped to have its edge lie snugly in contact with the wall of the hopper and which is dished or upset adjacent one end to form said hump D, as shown. The other end of said plate is bent over to form a hook H in which the outer edge of the wall C of the hopper A is adapted to be received and engaged; said hook coacting with the edge of the said wall to limit the inward movement of said plate G in an obvious manner.

The invention may be applied to the form of hoppers shown in Figs. —1— and —2— in which the barrel of the machine is vertically disposed, as set forth in my copending application for improvements in meat chopper, bearing Serial No. 648,675, filed September 11, 1911, and may also be applied to the vertically disposed hoppers of machines having horizontally disposed barrels as indicated in Figs. —3— and —4—; the shape of the plate I corresponding to the plate G, shown in Fig. —1—, being slightly varied to accord with and adapt it to the particular shape of the hopper or the hopper may, as shown in Fig. —4—, be cast to provide the hump D as an integral part of one wall of said hopper.

The invention is very simple and has proved to be very efficient to prevent accident.

Some hoppers of meat choppers are relatively very deep and others are shallow according to the designs of different manufacturers and in order that my finger guard may be applied to existing meat choppers of all manufacturers the same is preferably rendered adjustable in the hopper, as shown in Fig. —6—. The finger guard J, therein shown, consists merely of an L-shaped piece of sheet metal which is equipped in one arm with a longitudinal slot K through which the shank of a bolt L is adapted to pass, the latter passing through an opening in the wall of the hopper M and receiving a thumb nut N on its projecting end thus enabling said member J to be clamped in position within the said hopper M in an obvious manner.

I claim as my invention:

1. In a meat chopper, a funnel shaped hopper, and a finger guard comprising a strip of resilient material having angularly disposed legs, one of said legs engaging the hopper close to its mouth and the other leg engaging said hopper near the smaller end thereof.

2. In a meat chopper, a funnel shaped hopper, a finger guard comprising a strip of resilient material having angularly disposed legs, one of said legs engaging the hopper close to its mouth and the other leg engaging said hopper near the smaller end thereof, and means intermediate the ends of said strip for varying the position of one leg thereof.

3. In a meat chopper, a funnel shaped hopper, a finger guard comprising a strip of resilient material having angularly disposed legs, one of said legs engaging the hopper close to its mouth and the other leg engaging said hopper near the smaller end thereof, a bolt passing through said hopper and through one leg of said strip intermediate its ends, and a nut on said bolt for varying the position of the remaining leg.

4. In a meat chopper, a funnel shaped hopper, and a finger guard comprising a resilient strip of material having longer and shorter legs extending substantially at right angles, the longer leg lying against the wall of said hopper near its mouth, the shorter leg having its free end resting against the inner wall of the hopper, a bolt passing through said longer leg and the side of the hopper, and a nut on said bolt whereby the position of the guard may be varied.

5. In a meat chopper, a funnel shaped hopper, and a finger guard located within said hopper comprising a strip of resilient material having a pair of angularly disposed legs, one of said legs lying along the inner side of the wall of said hopper and having a rebent end engaging the lip of the hopper and the other leg having its end bearing against the inner side of the hopper wall to hold the first mentioned leg with one end spaced from said inner side.

In testimony whereof I have signed my name in presence of two subscribing witnesses.

PHILIP GANZHORN.

Witnesses:
 MAE M. BOYLE,
 F. T. HIGLEY.